April 22, 1924.
J. HIGGINS ET AL
AUTOMOBILE BUMPER
Filed May 3, 1923
1,491,042
3 Sheets-Sheet 1
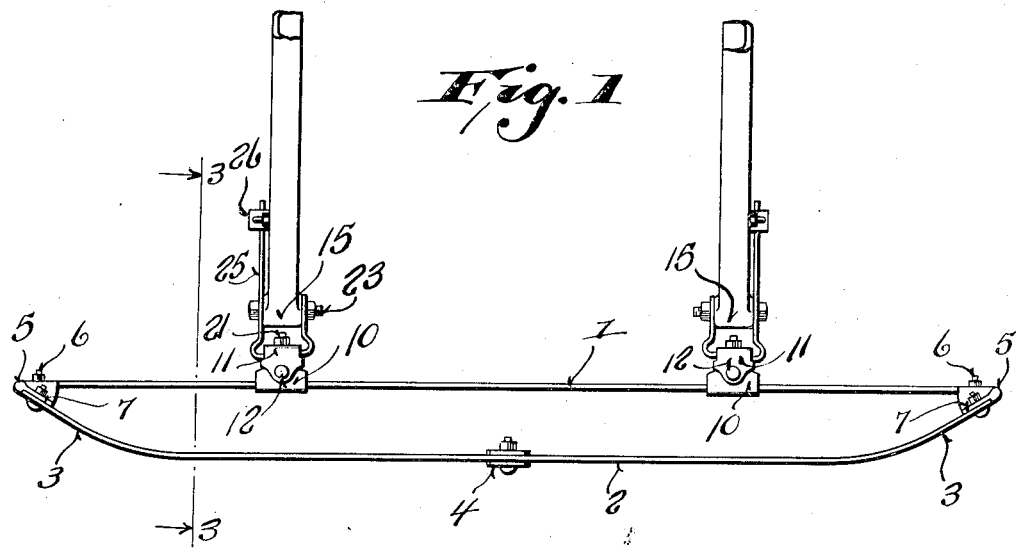
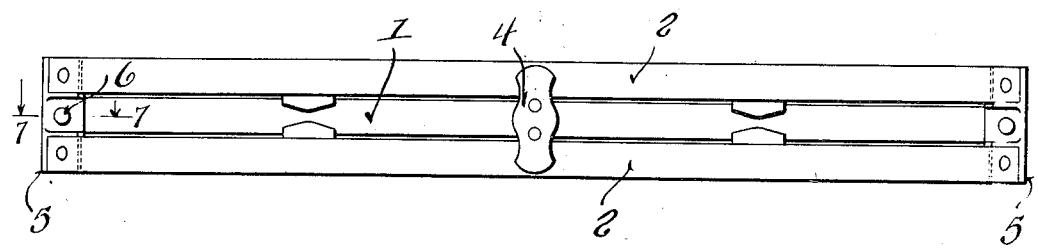
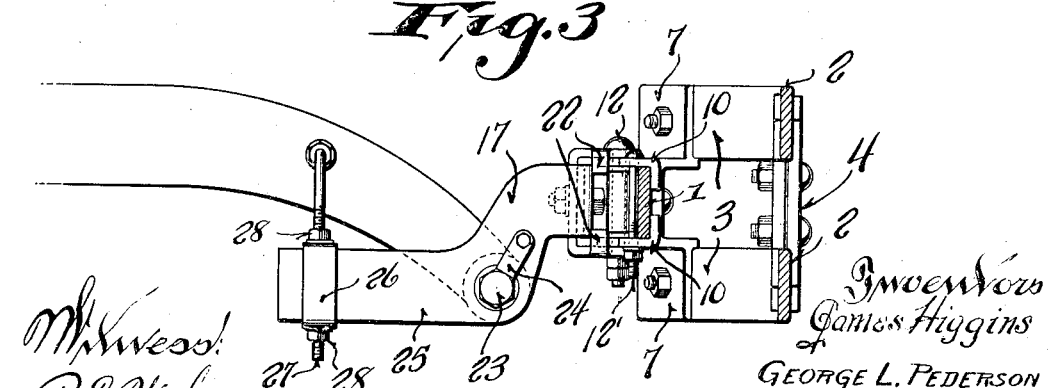
Inventors
James Higgins
George L. Pederson
Victor Jakob April 22, 1924.  
J. HIGGINS ET AL  
AUTOMOBILE BUMPER  
Filed May 3, 1923  
1,491,042  
3 Sheets-Sheet 2
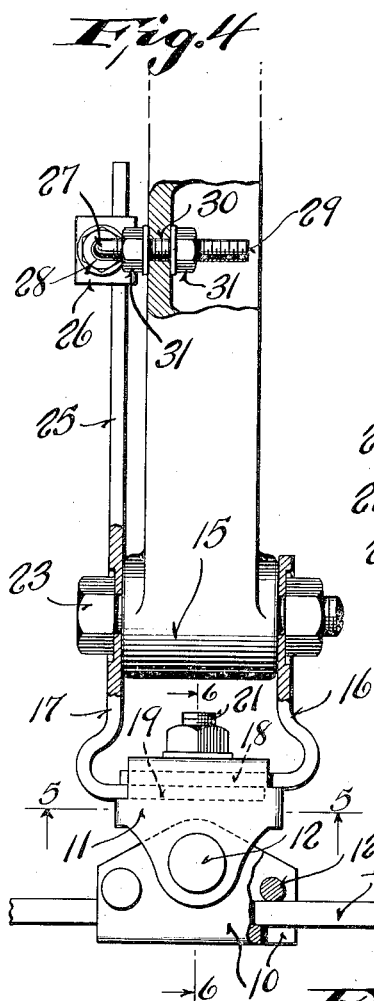
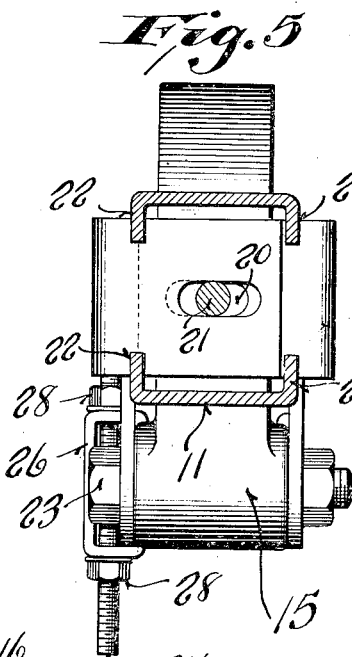
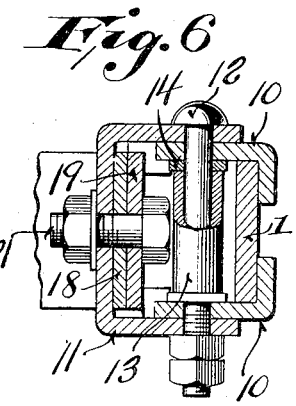
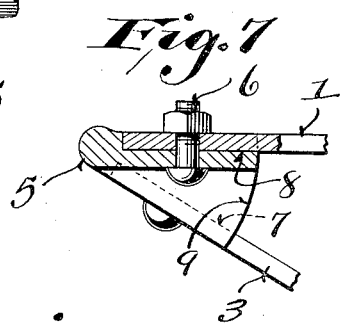
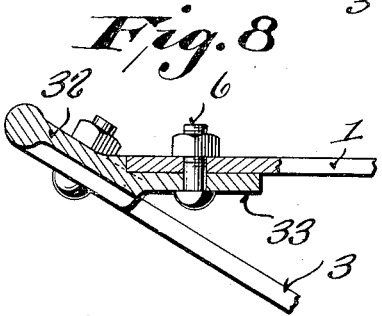
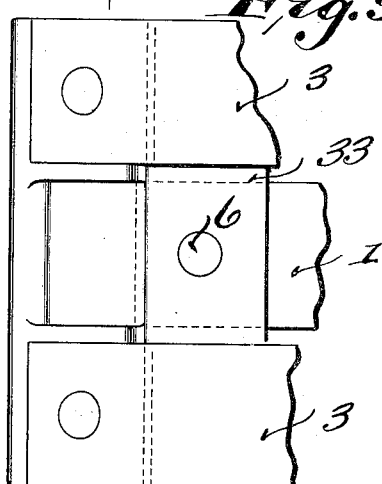
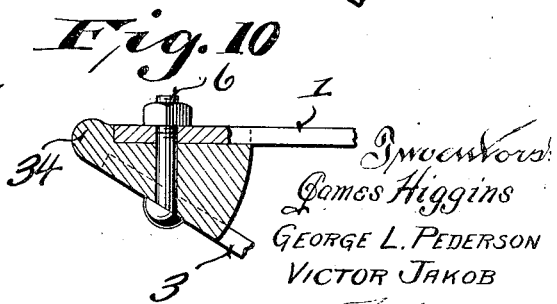
Inventors  
James Higgins  
George L. Pederson  
Victor Jakob April 22, 1924.
J. HIGGINS ET AL
AUTOMOBILE BUMPER
Filed May 3, 1923
1,491,042
3 Sheets-Sheet 3
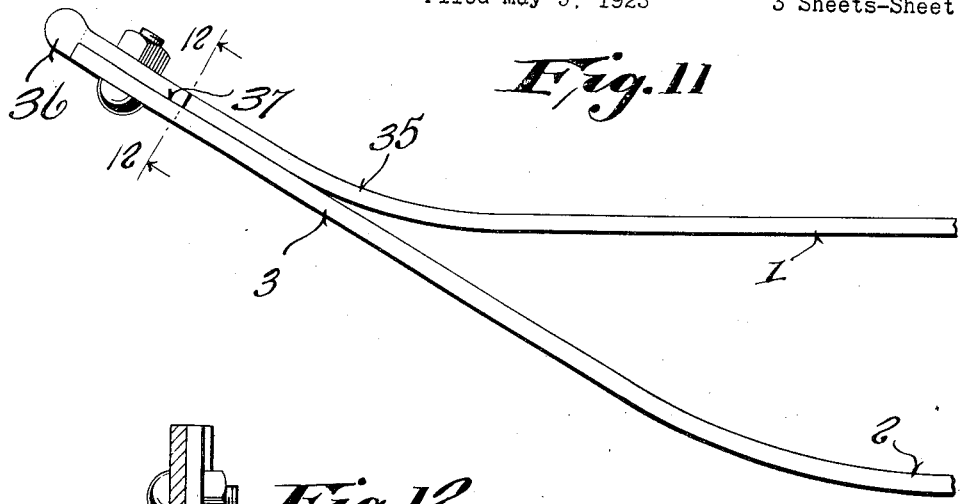
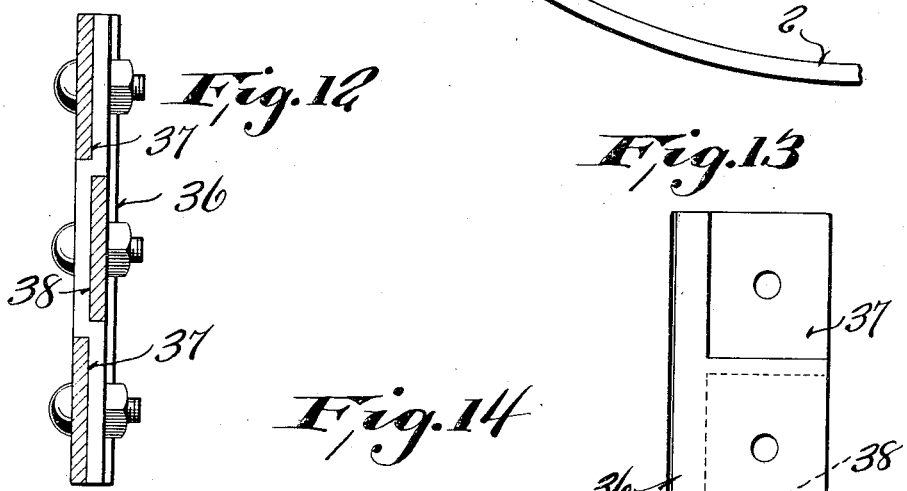
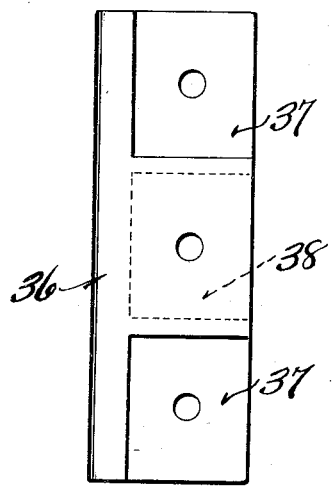
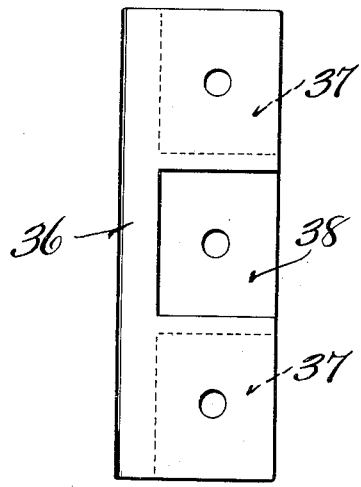
Witness:
R. E. Weber
Inventors:
James Higgins
George L. Pederson
Victor Jakob
Young & Young
Attorneys Patented Apr. 22, 1924.

1,491,042

UNITED STATES PATENT OFFICE.

JAMES HIGGINS, GEORGE L. PEDERSON, AND VICTOR JAKOB, OF RACINE, WISCONSIN.

AUTOMOBILE BUMPER.

Application filed May 3, 1923. Serial No. 636,296.

*To all whom it may concern:*

Be it known that we, JAMES HIGGINS, GEORGE L. PEDERSON, and VICTOR JAKOB, the latter a citizen of Germany, and the former both citizens of the United States, and all residents of Racine, in the county of Racine and State of Wisconsin, have invented certain new and useful Improvements in Automobile Bumpers; and we do hereby declare that the following is a full, clear, and exact description thereof.

This invention relates to automobile bumpers, and is particularly directed to a spring bumper.

Objects of this invention are to provide a multiple spring bumper, in which means are provided for firmly joining the front and rear bumper bars in a manner to prevent racking motion between such bars so that the bumper will at all times present a sightly and attractive appearance, with the bars held in correct relative arrangement, to provide a means for joining the ends of the bars in a manner to relieve the attaching bolts of a large portion of the strain, and to provide a bumper in which a minimum of bending of the bars during the manufacture of the bumper is secured, and to provide a bumper in which replacements can be easily accomplished.

In bumpers of this general type, difficulty has been experienced in preventing localization of stresses adjacent the point of attachment of the rear bar with consequent rapid crystallization and subsequent breaking of such parts.

This invention is designed to overcome the above noted defect, and therefore has for its further objects the provision of means for preventing the localization of stresses, and particularly the provision of means for pivotally supporting the rear bar at points intermediate its ends so as to accommodate the bending motion of the bar, and to provide means whereby a slight sliding motion of the bar in its support is secured to thus fully relieve the bar of any excessive local stresses, and also prevent undue stresses at the ends of the vehicle frame.

Embodiments of the invention are shown in the accompanying drawings, in which:

Figure 1 is a plan view of one form of bumper.

Figure 2 is a front view of the structure shown in Figure 1.

Figure 3 is an enlarged sectional view on the line 3—3 of Figure 1.

Figure 4 is an enlarged plan view of the structure shown in Figure 3, with parts broken away for clearness.

Figure 5 is a sectional view on the line 5—5 of Figure 4.

Figure 6 is a sectional view on the line 6—6 of Figure 4.

Figure 7 is a horizontal, sectional view on the line 7—7 of Figure 2.

Figure 8 is a corresponding view of a modified form of transverse attaching means.

Figure 9 is a front elevation of the structure shown in Figure 8.

Figure 10 is a view corresponding to Figures 7 and 8 and showing a further modification.

Figure 11 is a fragmentary view of a further form of bumper.

Figure 12 is a sectional view on the line 12—12 of Figure 11.

Figure 13 is a front elevation of the transverse attaching means for the ends of the spring bars, and Figure 14 is a rear elevation of the structure shown in Figure 13.

The bumper comprises front and rear bars of flat spring material, the rear bar 1 being preferably straight, as illustrated in Figure 1, and the front bars 2 having terminal portions 3 arranged in a manner to approach the terminals of the rear bar 1, as may be seen from Figure 1. These front bars 2 are spaced apart a distance greater than the width of the rear bar and are joined by transverse, centrally located tie-plates 4 so that upon excessive deflection of the front bars these transverse tie plates will contact with substantially the central portion of the rear bar 1 and the resiliency of the rear bar will be added to that of the front bars to resist further deflection.

The ends of the front and rear bars are joined by transverse attaching members 5 which are secured by means of bolts 6 to the several bars. The members 5 each comprise elongated body portions provided with end sockets 7, (see Figures 1 and 7) upon their forward faces adapted to form seats for the reception of the ends of the front bars 2. Upon the rear side of the members 5 an intermediate socket 8 is formed and adapted to seat the ends of the rear bar 1. The sockets, as will be seen from Figures 1 and 7, are arranged in a divergent relation to each other and segmental webs 9 are formed upon opposite sides of the central socket, (see Figure 7). In this manner a relatively light transverse attaching member is provided and the member is equipped with rectangular sockets which prevent relative turning motion, or racking motion, between the bars of the bumper—such bars being held rigidly in correct parallel relation and turning of the end members being prevented.

In spring bumpers, it is highly desirable that localization of stresses, at the point of attachment of the bumper to the automobile, be prevented. This is readily accomplished by the construction illustrated, as a clamp, consisting of two members 10, receives the rear bar 1 (see Figure 6) and is held in pivotal relation to a rear bracket 11 by means of a pintle bolt 12. This bolt 12 passes through a spacer sleeve 13 and passes through washers 14, if desired, arranged upon the inner sides of the brackets 10. It will be seen, therefore, that when the rear bar 1 is bowed, the clamps 10 will pivot about the bolts 12 and allow the gradual curving of the bowed rear spring bar 1 without subjecting such bar to excessive local stresses at its point of support, thus materially lengthening the life of such rear bar. The brackets 11 are preferably provided with overhanging arms between which the clamps 10 are pivotally positioned, as is clearly illustrated in Figures 4 and 6.

Bolts 12' pass through the clamps 10, as shown in Figures 3 and 4, and frictionally clamp the members 10 to the upper and lower sides of the rear bar 1. It is further to be noted, as may be seen from Figure 4, that the bolts 12' provide a frictional grip between the bars 1 and overhanging portions of the clamps 10, thus definitely positioning the bar 1 and maintaining it in such position.

The width of the ends 15 of the side frames of automobiles varies for different makes of cars, and in order to accommodate this variation in width an inner and an outer attaching member 16 and 17 are slidably related to the bracket 11. This is accomplished by providing inturned ends 18 and 19, respectively, each of which is provided with an elongated slot 20 through which a bolt 21 is passed to thus clamp the members in their adjusted position. It is to be noted that the bracket 11 has inturned lips 22 which engage the forward faces of the members 18 and 19, as may be seen from Figures 4 and 5, and thus relieve bolt 21 of excessive stresses—the major portion of the stress being borne by the inturned lips 22. The members 16 and 17 are adapted to be positioned upon opposite sides of the portion 15 of the side frames and to receive the spring or shackle bolt 23. It is to be understood that wherever bolts are illustrated, together with washers, in this disclosure, that the washers may obviously be spring washers so as to prevent unscrewing of the bolt. If desired, an additional member 24 may be bolted to the member 17, (see Figure 3) and may bear against the head of the spring or shackle bolt 23 to prevent turning of such bolt.

As is well known, the curvature of the side frame bars of different makes of automobiles varies considerably, and it is therefore desirable to provide means for insuring the correct relative position of the bumper to the forward portion of the automobile. This is readily accomplished by providing the members 17 with rearward extensions 25, which are held by a surrounding member 26. Through this member a bolt 27 passes and is provided with adjusting nuts 28, adapted to clamp against the upper and lower faces of the member 26. The upper end of the bolt 27 is provided with a right-angular extension 29 which is passed through a hole 30, provided in the side frame bars. Nuts 31 are positioned upon the inner and outer faces of the vertical web of the side frame bar and lock the extensions 29 in position. Thus the exact adjustment of the bumper bar may be secured and rotation of the bumper bar about the spring or shackle bolt is prevented.

Figures 8 and 9 show a modified form of transverse attaching member for the ends of the front and rear bars 1 and 2 of the bumper. In this form an elongated plate is provided which has one portion 32 substantially paralleling the terminal portions 3 of the front bar, and a second portion 33 substantially paralleling the rear bar 1. These portions are provided with sockets identically like those described in connection with Figures 1, 2, and 7, and provide a secure anchoring for the terminals of the front and rear bars. This construction also prevents racking motion of the bumper and rigidly holds the termminals in their correct relative position.

A further form of transverse attaching means for the terminals of the front and rear bars is illustrated in Figure 10 and indicated by the reference character 34. It will be seen that this form is similar to that illustrated in Figures 1, 2, and 7, except that the off-set flat or sheet-like formation is not followed, and instead a general wedge-shaped solid device is provided. This member is similarly socketed to receive the terminals 3 of the front bar and the terminals of the rear bar 1.

Although the bumper provided with a straight rear bar 1 is preferred, it may be desirable to provide a bumper, such as shown in Figure 11, with the rear bar 1 equipped with curved terminal portions 35 which substantially parallel the curved terminal portions 3 of the front bars 2. In this case the transverse attaching member for these terminal portions comprises a substantially flat, elongated member 36 provided with rectangular sockets 37 upon its front face, adapted to receive the terminals of the front bar, and with the rectangular socket 38 upon its rear face adapted to receive the terminals of the rear bar. As may be seen from Figure 12, these sockets may be conveniently arranged with their bottom faces substantially alined, thus providing a very light although strong construction without any excess metal whatsoever. This form will also prevent relative racking motion of the bars of the bumper and will thus prevent such bars from moving out of correct relative position adjacent their ends.

It will be seen that a spring bumper has been provided in which pivoting of the rear bar relatively to the attaching means is secured, thus avoiding excessive stresses, or localized stresses, and consequently avoiding crystallization. It will further be seen that the rear bar may slide slightly under flexure and thus may accommodate itself when the length between the supports has been varied, due to bowing. It will further be seen that the combined resiliency of both front and rear bars is at all times present and that an additional resisting force is provided when the central transverse member 4 contacts with the rear bar 1 upon excessive deflection.

It further may be seen that an extremely effective transverse attaching member for joining the terminal portions of the front and rear bars has been provided and that this member is so constructed that it cooperates with the bars to prevent relative shifting or racking motion.

Although several forms of the invention have been described specifically, it is to be understood that the invention may be variously embodied and is to be limited only as claimed.

As best shown in Figure 3 of the drawings, the tie plate member 4 is preferably composed of complementary front and back plates, the top and bottom of which are firmly clamped to the two front bars, being secured by suitable bolts between the bars, whereby said tie plates are secured without necessitating boring of holes in the front bars, which would tend to weaken the same. The pivotally connected joint members at the ends of the bar can obviously be applied to the rear of a vehicle also, in which case a suitable attaching member would be provided, or other suitable attaching members, from that shown, may be used at the front of the vehicle.

We claim:—

1. A spring bumper for an automobile comprising a rear bar, means adapted to be attached to said automobile for supporting said bar intermediate its ends, a pair of front bars having their ends joined to the ends of said rear bar and spaced apart a distance greater than the width of said rear bar, and a transverse member joining said front bars adjacent their central portion, whereby when said bumper is greatly flexed said transverse member will engage said rear bar at a point between its points of attachment to its supporting means.

2. A bumper for automobiles comprising a spring body, brackets engaging said body intermediate its ends, and telescopic means for engaging opposite sides of the side frames of said automobile and for pivotally supporting said brackets.

3. A bumper for automobiles comprising a spring body, two pairs of clamps engaging said body intermediate its ends, a pair of brackets pivotally supporting said clamps, and a pair of members adjustably carried by each of said pairs of brackets and adapted to engage opposite sides of the side bars of said automobile.

4. A connecting member for the ends of the flat springs of a multiple spring bumper, said member comprising an elongated body portion having depressed portions on opposite sides thereof to form seats for the ends of the flat springs.

5. A connecting member for the ends of the flat springs of a multiple spring bumper, said member comprising a body portion having a plurality of depressed sockets for the reception of the ends of the flat springs, said sockets being open at their inner ends and closed at their outer ends, said member having a hole therethrough adjacent each socket for the reception of securing means.

6. A connecting member for the ends of springs of a multiple spring bumper, said member comprising an elongated body portion having a plurality of depressed sockets for the reception of the ends of the springs, said sockets being arranged upon opposite sides in a diverging relation to each other.

7. A spring bumper for an automobile comprising a straight rear bar, means for attaching said rear bar intermediate its ends to said automobile; a pair of front bars having rearwardly bowed ends, and transverse members joining the ends of said bars and having sockets forming seats for the ends of said bars, whereby racking motion of said bumper is prevented.

In testimony that we claim the foregoing we have hereunto set our hands at Racine, in the county of Racine and State of Wisconsin.

JAMES HIGGINS.
GEORGE L. PEDERSON.
VICTOR JAKOB.